April 21, 1953
H. V. HESS ET AL
2,635,986
CONTINUOUS PROCESS FOR SEPARATION
OF WAXLIKE CONSTITUENTS FROM OIL
Filed Feb. 10, 1949
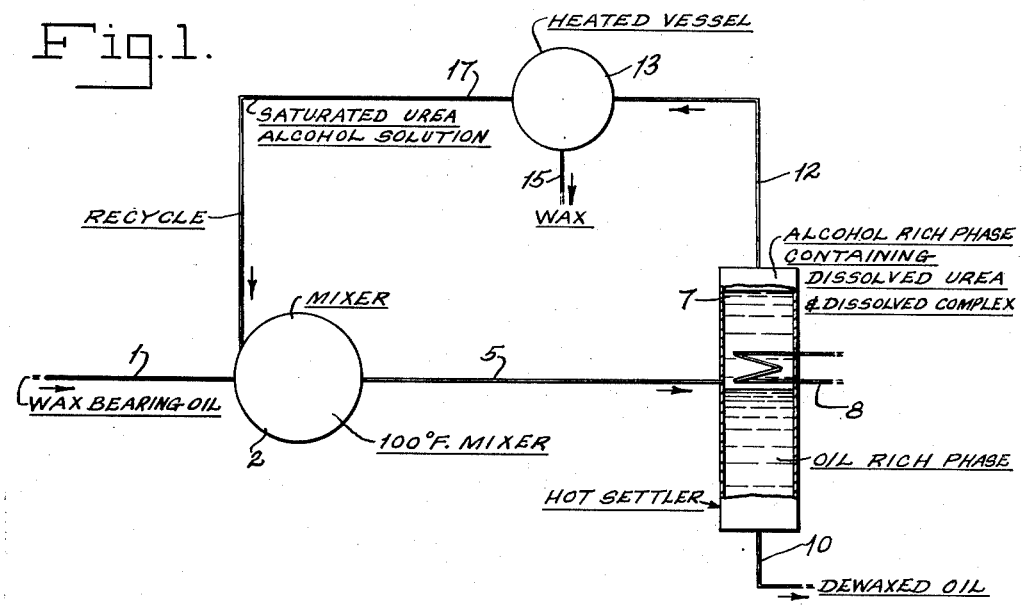
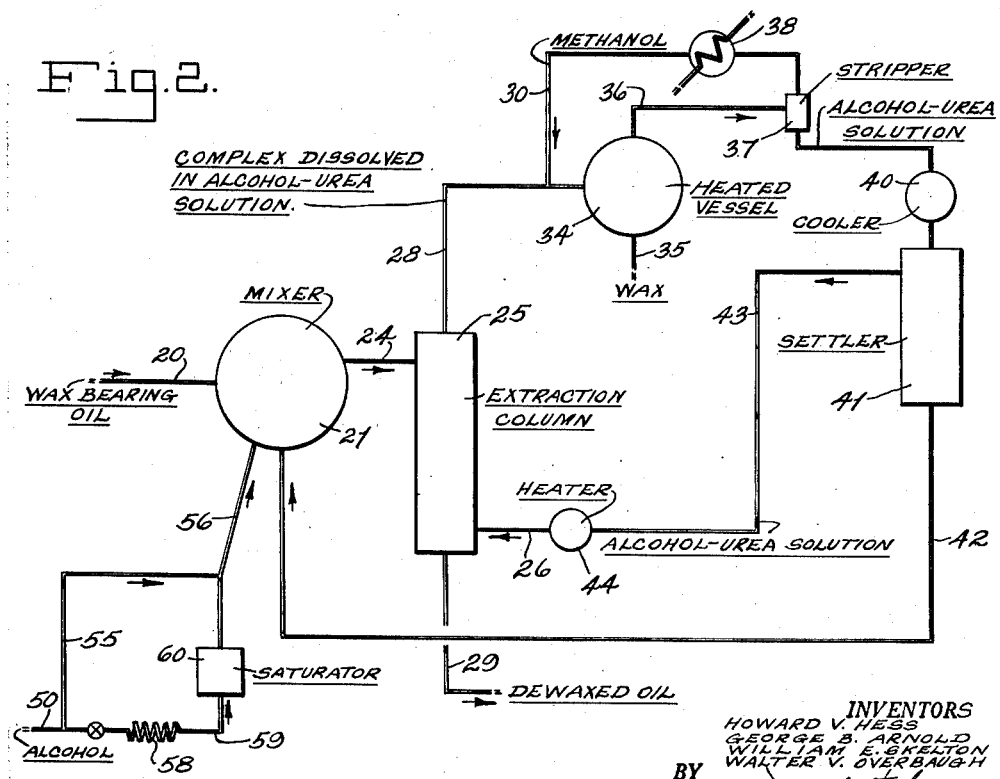
INVENTORS
HOWARD V. HESS
GEORGE B. ARNOLD
WILLIAM E. SKELTON
WALTER V. OVERBAUGH
BY
ATTORNEYS

UNITED STATES PATENT OFFICE 2,635,986

CONTINUOUS PROCESS FOR SEPARATION OF WAXLIKE CONSTITUENTS FROM OIL

Howard V. Hess, Beacon, George B. Arnold, Glenham, William E. Skelton, Beacon, and Walter V. Overbaugh, Fishkill, N. Y., assignors to The Texas Company, New York, N. Y., a corporation of Delaware Application February 10, 1949, Serial No. 75,542

4 Claims. (Cl. 196—17)

This invention relates to a continuous process for separation of wax-like constituents from oil such as contained in hydrocarbon mixtures by treatment with an organic agent such as urea.

The invention concerns a continuous process for separation of wax and wax-like constituents from oil by treatment with an organic complexing agent having the structure:

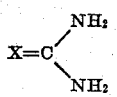

where X may be either oxygen or sulfur. Examples of effective compounds or agents are urea, thiourea, and derivatives thereof which are capable of forming with waxy constituents of mineral oil, solid crystalline complex compounds readily separable from the oil.

More particularly, the invention involves effecting contact between the feed oil and solid crystalline complexing agent in a mixing or contact zone advantageously in the presence of at least a small amount of a polar solvent liquid such as an alcohol since a small amount of such material appears to expedite the complexing action. Solvent present in the contacting zone may amount, for example, to about 5 to 10% of weight of both agent and oil, although either smaller or larger amounts may be used. The agent may be present in amount ranging from 3 to 4 pounds per pound of wax constituent removed from the oil.

The complexing action is advantageously carried out at a temperature in the range of about 70 to 125° F. In accordance with the invention, the resulting mixture of oil and crystalline complex material can be subjected to settling in a settling zone in the presence of a substantial amount of the polar solvent liquid at a temperature substantially above that employed in the mixing zone, for example, at a temperature in the range about 150 to 180° F. Under these conditions, at least a substantial portion of the complex material goes into solution in the solvent so that upon standing formation of liquid layers occurs namely, an oil-rich phase relatively lean in complex or substantially free from complex and an alcohol-rich phase containing dissolved complex. These phases are separately withdrawn. The oil-rich phase can be further treated by washing with additional solvent liquid to remove any residual complexing agent retained therein.

The solvent-rich phase containing the dissolved complex is advantageously heated to a still higher temperature in the range above 180° F., for example, up to about 200 or 225° F. so that the complex undergoes decomposition and upon standing or settling separates into two liquid phases namely, a wax-rich and a solvent-rich phase containing dissolved complexing agent. These phases are separately withdrawn and the wax-rich phase may be further treated to recover residual complexing agent as well as solvent.

The resulting hot solution of solvent and dissolved complexing agent is recycled to the previously mentioned contacting zone wherein it is brought into contact with feed oil at a relatively lower temperature such that the dissolved complexing agent precipitates or crystallizes therefrom. The necessary cooling can be effected by providing a cooling coil within the contacting zone. In this way, there is maintained present in the contacting zone a slurry of solid or crystalline complexing agent in liquid oil and the small amount of solvent present. The hot recycle stream can be commingled with the feed oil stream prior to introduction to the mixer. Cooling of the recycle stream after commingling with the oil is preferable as it permits flowing of the normally solid agent in liquid form.

In the practice of the aforesaid process, it is advantageous to employ a low molecular weight aliphatic alcohol having from 1 to 5 carbon atoms per molecule or other polar solvent which like these alcohols exerts a substantial solvent action on the complexing agent at temperatures in the range of about 180° F. and higher but exerts only a slight solvent action on the agent at temperatures in the range 125° F. and below and has very limited miscibility with the oil undergoing treatment even with temperatures up to about 200° F. Low molecular weight ketones and amines modified to suitable solubility characteristics by water addition may be employed.

One feature of the invention involves the use of the polar solvent liquid to effect extraction of the resulting crystalline complex material from the oil undergoing treatment. Thus, it has been found that the crystalline complex formed by treating wax-bearing mineral oil with urea at normal room temperature is soluble to a substantial extent in an aliphatic alcohol such as ethyl alcohol at a temperature in the range 150 to 180° F. By treating the resulting mixture of oil and crystalline complex with the alcohol under these conditions of temperature, the crystalline complex material can be separated as a solution, leaving dewaxed oil. The resulting solution is then raised to a somewhat higher temperature sufficient to effect decomposition of the dissolved complex whereby wax is liberated and can be discharged from the system. The hot solution of urea and alcohol upon cooling provides a slurry containing solid urea which is very effective as a complexing agent for the treatment of additional feed oil.

By a modified procedure, the initial mixture of oil and complex in the presence of solvent liquid may be subjected to countercurrent contact with a stream of solvent-urea at the aforementioned elevated temperatures effective to extract the crystalline complex from the oil. The resulting extract solution is then treated to separate wax and recover solvent and urea. This procedure will be described in more detail in connection with Figure 2 of the drawing.

Reference will now be made to Figures 1 and 2 of the drawing in order to describe the invention in more detail.

As indicated in Figure 1, a wax-bearing feed oil is drawn from a source not shown through a pipe 1. By way of example, this oil may be a lubricating oil distillate having a Saybolt Universal viscosity of about 300 seconds at 100° F. containing about 1% wax by volume and having a Freon Haze Test above —20° F.

This oil is introduced to a mixing vessel 2 maintained at a temperature of about 100° F. wherein it is brought into intimate contact with a saturated solution of urea in ethyl alcohol. The alcohol urea solution may amount to 1 to 3 volumes per volume of oil depending on the temperature at which it is saturated.

Wax constituents quickly enter into complex formation with the urea forming a crystalline complex consisting of about 25% wax and 75% urea by weight. X-ray analysis indicates that the urea crystal which is normally tetragonal in form transforms itself into a hexagonal system in the resulting crystalline complex.

It appears necessary to precipitate the complex to effect the dewaxing. Once precipitated the complex is sufficiently stable so that it may be dissolved.

As indicated in Figure 1, a stream of the contacted mixture is drawn off through pipe 5 to a settling vessel 7 maintained at a temperature of about 150 to 180° F. The temperature can be maintained by providing a heating coil 8 in the upper portion of the vessel. Under these conditions, the complex goes into solution in the alcohol and if desired additional alcohol may be added. As a result, an oil-rich phase collects in the bottom of the vessel 7 comprising dewaxed oil which is discharged through pipe 10. An alcohol-rich phase as later mentioned collects as an upper layer.

The aforesaid heating coil is advantageously located in the bottom of the alcohol-rich phase and above the interface between the oil-rich and solvent-rich phases.

This dewaxed oil may retain a small amount of solvent and urea. Therefore, it may be passed to a recovery unit not shown wherein it is subjected to washing with additional solvent liquid to extract residual urea therefrom and thereafter may be subjected to distillation to distill residual solvent therefrom. The dewaxed oil product will have a "Freon Cloud" of about minus 65 to minus 75 as compared with above minus 20 for the feed oil. This cloud test is determined by mixing the oil with "Freon 12" (dichloro difluoro methane) in the proportion of about 90% "Freon 12" and 10% oil by volume, chilling the mixture and observing the point at which wax haze appears.

The upper layer collecting in the vessel 7, as already stated, is an alcohol-rich phase and it contains dissolved complex and unused urea. This is drawn off in continuous stream through pipe 12 to a heated vessel 13 wherein it is maintained at a temperature in the range 180° F. and above, for example, up to about 200° F. and such that the complex undergoes decomposition, liberating wax therefrom. The wax separates as a liquid phase and is withdrawn therefrom through pipe 15. Since the wax may retain small amounts of solvent and urea, it likewise can be passed to a recovery unit not shown wherein residual solvent and urea is stripped from the wax. This wax amounts to about 1% by volume of the feed oil.

The hot alcohol-rich layer accumulating in the vessel 13 is drawn off through pipe 17 and consists of an alcohol-urea solution at the temperature prevailing in the vessel 13. This solution is conducted to the mixing vessel 2 previously referred to wherein it is reduced to the desired contacting temperature.

Although not specifically shown in Figure 1, provision may be made for using methanol for complex breaking as will be described in connection with Figure 2.

Provision, not shown, may be made for supplying make-up urea and make-up solvent to the mixing vessel in order to compensate for losses suffered in the operation.

Referring to Figure 2, the feed oil is drawn from a source not shown through a pipe 20 to a mixer 21. In the mixer 21 the feed oil is brought into contact at about 100° F. or at a temperature in the range of about 70 to 125° F., with solid urea introduced to the mixer as will be mentioned later.

The resulting mixture of feed oil and crystalline complex in the presence of alcohol is drawn off through a pipe 24 to an extraction tower 25 wherein it is subjected to countercurrent contact with a rising stream of alcohol-urea at a temperature in the range about 150 to 180° F. The alcohol stream, saturated with urea at about 100° F. or at a temperature not in excess of about 125° F. is introduced through pipe 26 from a succeeding point in the system. In this way the complex is extracted from the feed mixture and the extracted material in solution in the alcohol is continuously drawn off through pipe 28 while the resulting extracted oil is discharged through pipe 29. The discharged oil may be further treated for recovery of urea and alcohol.

The hot alcohol solution flowing through pipe 28 is diluted with methanol from pipe 30 and passed to a heater 34 wherein it is heated to 200° F. or to a temperature substantially above the aforesaid extraction temperature and sufficient to decompose the complex and precipitate wax.

The heater 34 is advantageously in form of a settling vessel with heating coil. Wax is drawn off through pipe 35 in a molten condition.

The wax may retain residual amounts of solvent and urea and, therefore, can be subjected to further treatment in a recovery unit not shown for the recovery of these residual materials.

The alcohol-urea solution is drawn off through pipe 36 to a stripper 37 wherein methanol is stripped off, condensed in cooler 38 and returned through pipe 30. The hot alcohol-urea mixture passes to a cooler 40 wherein it undergoes cooling to a temperature of about 100° F. so that urea crystallizes from the alcohol in a settler 41 and thus provides a slurry containing solid urea in crystalline form. This slurry is drawn off through pipe 42 for recycle to the mixer 21. The supernatant liquid (alcohol saturated with urea) is drawn off through pipe 43 to heater 44 for return to column 25.

Make-up alcohol may be supplied from a source not shown through pipe 50, branch pipes 55 and 56 leading to the mixer 21. To supply make-up urea, a portion of the alcohol stream may be diverted to a heater 58 wherein it is heated to a temperature of 150 or 180° or higher, if desired, and the resulting hot stream passed through pipe 59 to a vessel 60 containing a mass of solid urea crystals. During passage through the vessel 60, the dissolved urea and the resulting solution is passed through previously mentioned pipe 56 for passage to the mixer 21.

The wax discharged from pipe 35 of Figure 2 as well as that discharged from pipe 15 of Figure 1 may comprise hydrocarbons varying in molecular weight over a relatively wire range and this waxy material may be subjected to distillation or other fractionating operations to separate the constituents according to molecular weight. In the case of dewaxing relatively low boiling stocks for the production of diesel fuel, for example, it may be advantageous to so fractionate the wax-like material obtained from the complex, separate therefrom low molecular weight constituents which may be blended back with the main body of dewaxed oil and thereby increase the yield of oil having good cetane values.

When treating relatively low viscosity oils such as petroleum hydrocarbons in the range up to and including gas oil hydrocarbons, or heavier oils which have been diluted with a non-polar diluent, to remove paraffinic or other constituents capable of entering into complex formation with oil, the feed oil itself may provide the slurry medium in the solid complexing agent within the contact zone. In such case, it is still advantageous to maintain the urea crystals wetted with a small amount of a hydroxyl-containing liquid such as alcohol or water. Thereafter, the resulting complex compounds are extracted from the mixture by washing or extraction with a further quantity of a polar solvent liquid in a manner as previously described.

Contact with the complexing agent may be carried out in steps or the complexing agent may be incorporated in a succession of small increments to a stream of the feed oil flowing through a tubular mixing zone. The feed oil may be subjected to a plurality of separate treatments with the complexing agent so as to segregate selected fractions of wax or other constituents to be removed from the oil.

Although mention has been specifically made of the separation of wax from relatively low boiling oils nevertheless it is contemplated that the invention has application to the treatment of other petroleum fractions including wax distillates and residual wax-bearing fractions.

The process may be used to effect separation of normally liquid paraffins from non-paraffinic hydrocarbons such as aromatics and naphthene hydrocarbons and thus provide a means for manufacturing transformer oil. On the other hand, certain aromatic and naphthenic hydrocarbons having long aliphatic side chains enter into complex formation with urea and thus such constituents may be separated from hydrocarbon mixtures containing them by the procedure of this invention. Oxidized hydrocarbons enter into complex formation, and, therefore, the invention may be used for removing oxygen-containing compounds from mineral oils such as used lubricating oils or oils which have been subjected to previous treatment with oxidizing agents. It may have application to the treatment of oils derived from animal, vegetable and marine sources. Oils which have been subjected to other types of refining such as hydrogenation may subsequently be treated by the process of this invention.

The invention may have application in conjunction with conventional low temperature dewaxing operations. Thus the present invention may be used either to effect preliminary removal of wax prior to conventional dewaxing or to the removal of residual wax constituents from oil previously dewaxed at low temperatures.

The process may be used for deoiling wax concentrates as well as for the fractionation of wax according to molecular weight. When treating concentrates and also other heavy or viscous feed materials it is advantageous to dilute the feed with a non-polar solvent liquid such as petroleum naphtha, naphtha hydrocarbons or liquefied normally gaseous hydrocarbons.

While urea has been specifically mentioned, it is contemplated that substituted derivatives thereof such as ethanol urea, diethyl urea, butyl urea, may be used as well as other derivatives containing various di, tri and/or tetravalent inorganic and/or organic compounds.

Obviously many modifications and variations of the invention, as hereinbefore set forth, may be made without departing from the spirit and scope thereof, and, therefore, only such limitations should be imposed as are indicated in the appended claims.

We claim:

1. In the separation of wax from a feed mixture of wax and oil by contacting said feed mixture with a complexing agent selected from the group consisting of urea and thiourea, said contact being effected with solid particles of said complexing agent in the presence of at least a small amount of polar solvent liquid with the resulting formation of a crystalline complex consisting of wax and said complexing agent, the improvement which comprises passing a stream of resulting mixture of oil and crystalline complex to an extraction zone, contacting said mixture of oil and crystalline complex in said extraction zone with a polar solvent liquid which is saturated with complexing agent at a temperature not in excess of about 125° F., said polar solvent liquid being substantially immiscible with the oil at a temperature up to about 200° F., substantially miscible with said complexing agent at a temperature in the range above 125° F., but only partially miscible with said complexing agent at a temperature in the range of 125° F. and below, effecting contact of said complexing agent-saturated polar solvent with said mixture of oil and complexing agent at a temperature between 125 and 200° F. whereby said crystalline complex is extracted from said mixture without substantial decomposition and there is formed an extract phase comprising said complex dissolved in said polar solvent and removing said extract phase from said extraction zone.

2. An improvement of the type described in claim 1 wherein urea is employed as the complexing agent.

3. The improvement of the type described in claim 1 in which the polar solvent is an aliphatic alcohol higher than methyl alcohol.

4. An improvement of the type described in claim 1 wherein decomposition of the extracted complex is effected by diluting the extract phase with polar solvent.

HOWARD V. HESS.
GEORGE B. ARNOLD.
WILLIAM E. SKELTON.
WALTER V. OVERBAUGH.

References Cited in the file of this patent

UNITED STATES PATENTS

| Number | Name | Date |
|---|---|---|
| 1,830,859 | Schotte et al. | Nov. 10, 1931 |
| 2,376,008 | Riethof | May 15, 1945 |
| 2,499,820 | Fetterly | Mar. 7, 1950 |

OTHER REFERENCES

Technical Oil Mission, Reel 143, translation by Shell Development Co. of German application B 190,197 (Bengen), deposited in Library of Congress May 22, 1946 included in Index released May 31, 1946 (5 pages, 2-6 inclusive, only).